United States Patent
Ogawa et al.

(10) Patent No.: US 11,710,856 B2
(45) Date of Patent: Jul. 25, 2023

(54) SOLID ELECTROLYTE LAMINATED SHEET AND SOLID STATE BATTERY

(71) Applicant: Honda Motor Co., Ltd., Tokyo (JP)

(72) Inventors: Atsushi Ogawa, Saitama (JP); Ushio Harada, Saitama (JP); Hiroto Maeyama, Saitama (JP); Toru Sukigara, Saitama (JP); Kazuki Chiba, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 449 days.

(21) Appl. No.: 16/727,887

(22) Filed: Dec. 26, 2019

(65) Prior Publication Data

US 2020/0212500 A1 Jul. 2, 2020

(30) Foreign Application Priority Data

Dec. 27, 2018 (JP) ................................ 2018-243971

(51) Int. Cl.
| | | |
|---|---|---|
| *H01M 10/0585* | (2010.01) | |
| *H01M 10/0562* | (2010.01) | |
| *H01M 50/451* | (2021.01) | |
| *H01M 50/457* | (2021.01) | |
| *H01M 50/489* | (2021.01) | |
| *H01M 50/491* | (2021.01) | |
| *H01M 50/497* | (2021.01) | |

(52) U.S. Cl.
CPC ... *H01M 10/0585* (2013.01); *H01M 10/0562* (2013.01); *H01M 50/451* (2021.01); *H01M 50/457* (2021.01); *H01M 50/489* (2021.01); *H01M 50/491* (2021.01); *H01M 50/497* (2021.01); *H01M 2300/0068* (2013.01); *H01M 2300/0094* (2013.01)

(58) Field of Classification Search
CPC ......... H01M 10/0585; H01M 10/0562; H01M 50/449; H01M 2300/0068; H01M 2300/0094; H01M 50/451; H01M 50/457; H01M 50/489; H01M 50/491; H01M 50/497

See application file for complete search history.

(56) References Cited

U.S. PATENT DOCUMENTS

| | | | | |
|---|---|---|---|---|
| 2015/0349379 | A1* | 12/2015 | Hozumi | H01M 10/0562 429/304 |
| 2018/0166741 | A1* | 6/2018 | Xu | H01M 10/0486 |
| 2018/0375148 | A1* | 12/2018 | Yersak | H01M 50/403 |

FOREIGN PATENT DOCUMENTS

| | | |
|---|---|---|
| CN | 105322195 | 2/2016 |
| CN | 108232288 | 6/2018 |
| JP | 2000106154 | 4/2000 |
| JP | 2013127982 | 6/2013 |
| JP | 2014096311 | 5/2014 |
| JP | 2015153460 | 8/2015 |
| JP | 2016031789 | 3/2016 |
| WO | 2015151144 | 10/2015 |

OTHER PUBLICATIONS

Office Action of Japan Counterpart Application, with English translation thereof, dated Jan. 25, 2022, pp. 1-8.
"Office Action of Japan Counterpart Application" with English translation thereof, dated Sep. 14, 2021, p. 1-p. 8.
Office Action of China Counterpart Application, with English translation thereof, dated Feb. 2, 2023, pp. 1-14.

\* cited by examiner

*Primary Examiner* — Osei K Amponsah
(74) *Attorney, Agent, or Firm* — JCIPRNET

(57) ABSTRACT

Provided is a solid electrolyte laminated sheet having a self-supporting property and capable of realizing a solid state battery having high output characteristics. A plurality of supports are used, a solid electrolyte is filled in each support to form a self-supporting sheet, and the self-supporting sheets are superimposed to form a solid electrolyte laminated sheet. Specifically, the solid electrolyte laminated sheet is configured by setting a layer of the solid electrolyte laminated sheet in contact with a positive electrode layer being the outermost layer as a self-supporting sheet in which a solid electrolyte resistant to oxidation is filled, and a layer in contact with a negative electrode layer being the opposite outermost layer as a self-supporting sheet in which a solid electrolyte resistant to reduction is filled.

7 Claims, No Drawings

SOLID ELECTROLYTE LAMINATED SHEET AND SOLID STATE BATTERY

CROSS-REFERENCE TO RELATED APPLICATION

This application claims the priority benefit of Japan Application No. 2018-243971, filed on Dec. 27, 2018. The entirety of the above-mentioned patent application is hereby incorporated by reference herein and made a part of this specification.

BACKGROUND

Technical Field

The disclosure relates to a solid electrolyte laminated sheet and a solid state battery.

Related Art

Conventionally, lithium ion secondary batteries have been widely used as secondary batteries having high energy density. A lithium ion secondary battery has a structure in which a separator is present between a positive electrode and a negative electrode and a liquid electrolyte (electrolytic solution) is filled.

Here, since the electrolytic solution of the lithium ion secondary battery is usually a flammable organic solvent, there are particularly problems with safety concerning heat. Therefore, a lithium ion solid state battery using an inorganic solid electrolyte in place of an organic liquid electrolyte has been proposed (see Patent Document 1).

The lithium ion solid state battery is a battery having a solid electrolyte layer between a positive electrode layer and a negative electrode layer. The solid electrolyte layer has a function of conducting lithium ions and a function as a separator that prevents a short circuit between a negative electrode active material layer and a positive electrode active material layer.

Here, the solid electrolyte layer serving as the separator is preferably formed as thin as possible in order to improve energy density, while being desirably self-supporting. Since the solid electrolyte layer is self-supporting, handling of the solid electrolyte on powder becomes easy, and mass production of the solid state battery becomes possible.

For this demand, a solid electrolyte sheet in which a support having an opening is used and a solid electrolyte is filled in the opening has been proposed (see Patent Documents 2 and 3).

According to the methods described in Patent Documents 2 and 3, a solid electrolyte sheet having a self-supporting property can be obtained. However, when it comes to continuous operation of a battery, it is desirable to have both oxidation resistance and reduction resistance as properties of the solid electrolyte layer, and the solid electrolyte sheets described in Patent Documents 2 and 3 have not been able to satisfy that point.
Patent Documents
Patent Document 1: Japanese Laid-open No. 2000-106154
Patent Document 2: Japanese Laid-open No. 2013-127982
Patent Document 3: Japanese Laid-open No. 2016-031789

SUMMARY

The disclosure provides a solid electrolyte laminated sheet having a self-supporting property and capable of realizing a solid state battery having high output characteristics.

The inventors have conducted earnest studies on the support of the solid electrolyte laminated sheet, and have discovered that the above problems can be solved if a plurality of supports are used, different solid electrolytes are filled in the respective supports, and the resultants are superimposed to form a solid electrolyte laminated sheet. The disclosure has thereby been accomplished.

That is, the disclosure is a solid electrolyte laminated sheet including a plurality of supports, wherein each of the supports is a self-supporting sheet in which a solid electrolyte is filled, and the self-supporting sheets constitute a laminate, wherein one outermost layer is a self-supporting sheet in which a solid electrolyte resistant to oxidation is filled, and the other outermost layer is a self-supporting sheet in which a solid electrolyte resistant to reduction is filled.

Another embodiment of the disclosure provides a solid state battery including a positive electrode layer containing a positive electrode active material, a negative electrode layer containing a negative electrode active material, and a solid electrolyte layer located between the positive electrode layer and the negative electrode layer, wherein the solid electrolyte layer includes the above solid electrolyte laminated sheet.

DESCRIPTION OF THE EMBODIMENTS

The embodiments of the disclosure are hereinafter described.

<Solid Electrolyte Laminated Sheet>

A solid electrolyte laminated sheet of the disclosure is a solid electrolyte laminated sheet including a plurality of supports, and is characterized in that each of the supports is a self-supporting sheet in which a solid electrolyte is filled, and the solid electrolyte laminated sheet is a laminate in which the self-supporting sheets are stacked.

[Self-supporting Sheet]

The solid electrolyte laminated sheet of the disclosure has a configuration in which a plurality of self-supporting sheets are stacked, and each of the self-supporting sheets has a configuration in which a solid electrolyte is filled in a support. The number of the self-supporting sheets constituting the solid electrolyte laminated sheet is not particularly limited if the number is 2 or more. Since it is possible to render the type of the solid electrolyte in contact with the positive electrode layer different from that of the solid electrolyte in contact with the negative electrode layer, and a simplest configuration can be achieved, the solid electrolyte laminated sheet of the disclosure is preferably composed of two self-supporting sheets, i.e., has a configuration including two supports.

In addition, the solid electrolyte laminated sheet of the disclosure is characterized in that one outermost layer is a self-supporting sheet in which a solid electrolyte resistant to oxidation is filled, and the other outermost layer is a self-supporting sheet in which a solid electrolyte resistant to reduction is filled. In such an aspect, the solid electrolyte laminated sheet of the disclosure is capable of exhibiting both oxidation resistance and reduction resistance properties. Accordingly, according to the solid electrolyte laminated sheet of the disclosure, a solid state battery having high output characteristics can be realized.

[Support]

The support constituting the solid electrolyte laminated sheet of the disclosure is a porous self-supporting sheet.

(Structure)

The support constituting the solid electrolyte laminated sheet of the disclosure is preferably a woven fabric or a nonwoven fabric. If the support is a woven fabric or a nonwoven fabric, the following porosity and thickness can be easily satisfied, and the solid electrolyte can be easily filled.

(Material)

A material of the support constituting the solid electrolyte laminated sheet of the disclosure is not particularly limited and may be any material that can constitute a self-supporting sheet. As examples thereof, there may be mentioned polyethylene terephthalate, nylon, aramid, $Al_2O_3$, glass and so on.

The support constituting the solid electrolyte laminated sheet of the disclosure is preferably composed of, among the above, a heat-resistant fiber. Since the support is composed of a heat-resistant fiber, in a manufacturing process or the like of a solid state battery, a short circuit can be suppressed even if pressing is performed at a high temperature exceeding, for example, 200° C. In addition, the solid electrolyte can be sintered by high-temperature pressing, and as a result, interfacial resistance can be reduced and the battery's output can be improved.

Furthermore, the support constituting the solid electrolyte laminated sheet of the disclosure preferably contains, among the heat-resistant fibers, at least one selected from the group consisting of an aramid fiber, an $Al_2O_3$ fiber and a glass fiber. The aramid fiber, $Al_2O_3$ fiber and glass fiber are preferred since fiber deformation due to heat is reduced.

(Porosity)

The support constituting the solid electrolyte laminated sheet of the disclosure has a porosity preferably in the range of 60% to 95%. The porosity is more preferably 70% to 90%, and particularly preferably 80% to 90%. Since the porosity is in the above range, the self-supporting property can be maintained while a decrease in ionic conductivity is suppressed.

Moreover, the porosity in the disclosure means a proportion of a gap per unit volume, which is expressed in percentage. Specifically, the porosity can be obtained from basis weight (g/m$^2$), sheet thickness (am), and a sheet material's density (g/cm$^3$) by the following equation (1).

[Equation 1]

$$\text{Porosity}(\%)=(1-\text{basis weight}(g/m^2)/\text{sheet thickness}(\mu m)/\text{sheet material's density}(g/cm^3))*100 \quad (1)$$

(Thickness)

The support constituting the solid electrolyte laminated sheet of the disclosure has a thickness preferably in the range of 5 μm to 30 μm. The thickness of the support is more preferably 5 μm to 20 μm, and particularly preferably 10 μm to 20 μm. If less than 5 μm, there is a risk that a short circuit may occur between electrodes when a battery is formed; on the other hand, if exceeding 30 μm, it is difficult to realize a battery having high energy density by forming the solid electrolyte laminated sheet into a laminate.

[Solid Electrolyte]

A solid electrolyte to be filled in each support constituting the solid electrolyte laminated sheet of the disclosure is not particularly limited and may be anything capable of conducting lithium ions between a positive electrode and a negative electrode. As examples thereof, there may be mentioned an oxide-based electrolyte or a sulfide-based electrolyte. In addition, other components such as a binder or the like may be added if necessary.

Moreover, in the solid electrolyte laminated sheet of the disclosure, a layer in contact with the positive electrode layer being the outermost layer is set as a self-supporting sheet in which a solid electrolyte resistant to oxidation is filled, and a layer in contact with the negative electrode layer being the opposite outermost layer is set as a self-supporting sheet in which a solid electrolyte resistant to reduction is filled. According to such a configuration, the solid electrolyte laminated sheet of the disclosure has both oxidation resistance and reduction resistance properties and is capable of realizing a solid state battery having high output characteristics.

(Lithium Element)

The solid electrolyte used in the solid electrolyte laminated sheet of the disclosure preferably contains a lithium element. Since the solid electrolyte contains a lithium element, the lithium ion conductivity can be improved.

Specifically, the solid electrolyte preferably contains a substance including at least lithium sulfide as a first component, and one or more compounds selected from the group consisting of silicon sulfide, phosphorus sulfide and boron sulfide as a second component. $Li_2S$—$P_2S_5$ is particularly preferred. Such a sulfide-based solid electrolyte is known to have higher lithium ion conductivity than other inorganic compounds, and may contain, in addition to $Li_2S$—$P_2S_5$, sulfides such as $SiS_2$, $GeS_2$, $B_2S_3$ and so on. In addition, $Li_3PO_4$ or halogen, a halogen compound and so on may be added to the solid electrolyte as appropriate.

The solid electrolyte may contain a lithium ion conductor composed of an inorganic compound as an inorganic solid electrolyte. As examples of the lithium ion conductor, there may be mentioned $Li_3N$, LISICON, LIPON ($Li_{3+y}PO_{4-x}N_x$), Thio-LISICON ($Li_{3.25}Ge_{0.25}P_{0.75}S_4$), and $Li_2O$—$Al_2O_3$—$TiO_2$—$P_2O_5$ (LATP).

The solid electrolyte may be of any of an amorphous structure, a glassy structure, a crystal (crystallized glass) structure or the like. If the solid electrolyte is a sulfide-based solid electrolyte composed of $Li_2S$—$P_2S_5$, the lithium ion conductivity of an amorphous body is $10^{-4}$ Scm$^{-1}$. On the other hand, the lithium ion conductivity of a crystalline body is $10^{-3}$ Scm$^{-1}$.

(Phosphorus or Sulfur)

The solid electrolyte used in the solid electrolyte laminated sheet of the disclosure preferably contains phosphorus and/or sulfur. Since the solid electrolyte further contains phosphorus and/or sulfur, the ionic conductivity of the obtained solid state battery can be improved.

<Method for Manufacturing Solid Electrolyte Laminated Sheet>

A method for manufacturing the solid electrolyte laminated sheet of the disclosure is not particularly limited, and a general method in the art can be applied. The solid electrolyte laminated sheet is obtained by forming a plurality of self-supporting sheets in which a solid electrolyte is filled in a support, and superimposing the self-supporting sheets to form a laminate.

Moreover, in the method for manufacturing the solid electrolyte laminated sheet of the disclosure, the type of the solid electrolyte used is selected so that one outermost layer is a self-supporting sheet in which a solid electrolyte resistant to oxidation is filled, and the other outermost layer is a self-supporting sheet in which a solid electrolyte resistant to reduction is filled.

[Method for Manufacturing Self-supporting Sheet]

As examples of a method for manufacturing each self-supporting sheet constituting the solid electrolyte laminated sheet of the disclosure, there may be mentioned a method in which a slurry is prepared in which a solid electrolyte is dissolved in a solvent, and the prepared slurry is coated on a support and dried. The solvent used in preparing the slurry of the solid electrolyte is not particularly limited if it has no adverse effect on the performance of the solid electrolyte. As examples thereof, there may be mentioned a non-aqueous solvent.

A coating method for coating the slurry containing the solid electrolyte on both sides or one side of the support is not particularly limited, and slide die coating, comma die coating, comma reverse coating, gravure coating, gravure reverse coating and so on may be mentioned as examples thereof.

The drying performed after coating of the slurry containing the solid electrolyte can be performed by a drying device using, for example, hot wind, a heater, high frequency or the like.

Moreover, the solid electrolyte laminated sheet of the disclosure may be the dried sheet as it is, but may also be further pressed to be increased in strength or density. As examples of a pressing method, there may be mentioned sheet pressing or roll pressing or the like.

As another method, there may be mentioned a method in which a solid electrolyte is made into a sheet when in the powder state, without being made into a slurry. In this case, a sandblasting method (SB method), an aerosol deposition method (AD method) and so on may be mentioned as examples thereof. The solid electrolyte may be collided at high speed to accumulate in and fill an opening of the support, or the solid electrolyte may be sprayed as it is.

Further, an autoclave method can also be adopted in which powder of the solid electrolyte is placed on the support in an inert gas and suctioned from below the support, and the solid electrolyte is filled in the support. Alternatively, there may also be mentioned a method in which the powder of the solid electrolyte is placed on the support, and is filled in voids of the support by being pressed using a pressing machine or the like.

[Method for Laminating Self-supporting Sheets]

A method for superimposing a plurality of self-supporting sheets is not particularly limited. A well-known method used in manufacturing a solid state battery can be applied, and there may be mentioned, for example, a method of laminating each sheet and pressing and crimping the same, or a method of pressing through between two rolls (roll to roll), and so on.

<Solid State Battery>

A solid state battery of the disclosure is a solid state battery including a positive electrode layer containing a positive electrode active material, a negative electrode layer containing a negative electrode active material, and a solid electrolyte layer located between the positive electrode layer and the negative electrode layer, wherein the solid electrolyte layer includes the above solid electrolyte laminated sheet.

[Positive Electrode and Negative Electrode]

In the solid state battery of the disclosure, the positive electrode active material used in the positive electrode layer and the negative electrode active material used in the negative electrode layer are not particularly limited, and may be anything if they function as a positive electrode and a negative electrode of a lithium ion solid state battery.

As examples of the positive electrode active material, in the case of a sulfide-based material, there may be mentioned titanium sulfide ($TiS_2$), molybdenum sulfide ($MoS_2$), iron sulfide ($FeS$, $FeS_2$), copper sulfide ($CuS$) and nickel sulfide ($Ni_3S_2$) and so on. In the case of an oxide-based material, there may be mentioned bismuth oxide ($Bi_2O_3$), bismuth plumbate ($Bi_2Pb_2O_5$), copper oxide ($CuO$), vanadium oxide ($V_6O_{13}$), lithium cobalt oxide ($LiCoO_2$), lithium nickel oxide ($LiNiO_2$), lithium manganese oxide ($LiMnO_2$), $Li(NiCoMn)O_2$, $Li(NiCoAl)O_2$, $Li(NiCo)O_2$ and so on. In addition, these may also be mixed and used.

As examples of the negative electrode active material, there may be mentioned a carbon material, specifically, artificial graphite, graphite carbon fiber, resin fired carbon, pyrolytic vapor grown carbon, coke, mesocarbon microbeads (MCMB), furfuryl alcohol resin fired carbon, polyacene, pitch-based carbon fiber, vapor grown carbon fiber, natural graphite, non-graphitizable carbon and so on. Alternatively, there may be mentioned mixtures of the above. Also, there may be mentioned metals themselves such as metallic lithium, metallic indium, metallic aluminum, or metallic silicon and so on, or alloys obtained by combining these metals with other elements or compounds.

The positive electrode and the negative electrode that constitute the solid state battery may be determined as follows. Two kinds are selected from among materials that can constitute an electrode, the two kinds of compounds are compared in respect of charge and discharge potential, and an arbitrary battery is configured by using the one exhibiting a noble potential for the positive electrode and the one exhibiting a low potential for the negative electrode.

<Method for Manufacturing Solid State Battery>

The solid state battery of the disclosure can be manufactured by disposing a solid electrolyte layer containing the solid electrolyte laminated sheet of the disclosure between the above-described positive electrode layer and negative electrode layer, and pasting and joining them together. A joining method is not particularly limited, and there may be mentioned, for example, a method of laminating each sheet and pressing and crimping the same, or a method of pressing through between two rolls (roll to roll), and so on.

Moreover, for the purpose of improving adhesion between the solid electrolyte layer and the positive electrode layer or the negative electrode layer, an active material having ionic conductivity, or an adhesive material which does not hinder the ionic conductivity may be disposed at a joining interface.

Moreover, the solid state battery of the disclosure using the solid electrolyte laminated sheet of the disclosure is configured so that the outermost layer in contact with the positive electrode layer is a self-supporting sheet in which the solid electrolyte resistant to oxidation is filled, and the outermost layer in contact with the negative electrode layer is a self-supporting sheet in which the solid electrolyte resistant to reduction is filled.

EXAMPLES

Next, examples of the disclosure are described, but the disclosure is not limited to these examples.

Example 1

[First Self-supporting Sheet]
(Preparation of Solid Electrolyte (1) Slurry)
9.7 g of powder of $Li_2S$—$P_2S_5$ (80:20 mol %) serving as a sulfide-based solid electrolyte were kneaded with 2.75 g of butyl butyrate for 1 minute to obtain a slurry. Further, 3 g of a butyl butyrate solution (binder solution) containing 10% by mass of SBR were added thereto and kneaded. In order to adjust the viscosity, 3 g of butyl butyrate were further added to obtain a solid electrolyte (1) slurry. The obtained solid electrolyte (1) slurry had a solid content of 54.9%.

[Fabrication of First Self-Supporting Sheet]
On a nonwoven fabric (material: polyethylene terephthalate, porosity: 86%, thickness: 19 μm) cut into a 100 mm square and previously fixed onto a steel sheet, coating was performed using a bar coater. After that, the butyl butyrate as the solvent was removed by drying at about 100° C. to obtain a sheet in which the solid electrolyte (1) is filled. By hollowing out a 10 mmφ circular sheet from the obtained sheet and pressing the same using a pressing machine with a pressure of about 3500 kg/cm², a 10 mmφ solid electrolyte (1) sheet having a thickness of 25 μm was obtained.

(Self-Supporting Property)
The obtained solid electrolyte (1) sheet was a self-supporting sheet without chipping of the periphery or cracks occurring therein even if pinched with tweezers, and having a strength that enables easy handling or moving operation.

(Ionic Conductivity)
The ionic conductivity of the obtained solid electrolyte (1) sheet was measured. The result was $1 \times 10^{-3}$ mS/cm.

[Second Self-Supporting Sheet]
(Preparation of Solid Electrolyte (2) Slurry)
9.7 g of powder of Thio-LISICON ($Li_{3.25}Ge_{0.25}P_{0.75}S_4$) serving as a sulfide-based solid electrolyte were kneaded with 2.75 g of butyl butyrate for 1 minute to obtain a slurry. Further, 3 g of a butyl butyrate solution (binder solution) containing 10% by mass of SBR were added thereto and kneaded. In order to adjust the viscosity, 3 g of butyl butyrate were further added to obtain a solid electrolyte (2) slurry. The obtained solid electrolyte (2) slurry had a solid content of 54.9%.

[Fabrication of Second Self-supporting Sheet]
On a nonwoven fabric (material: polyethylene terephthalate, porosity: 86%, thickness: 19 μm) cut into a 100 mm square and previously fixed onto a steel sheet, coating was performed using a bar coater. After that, the butyl butyrate as the solvent was removed by drying at about 140° C. to obtain a sheet in which the solid electrolyte (2) is filled. By hollowing out a 10 mmφ circular sheet from the obtained sheet and pressing the same using a pressing machine with a pressure of about 3500 kg/cm², a 10 mmφ solid electrolyte (2) sheet having a thickness of 25 μm was obtained.

(Self-supporting Property)
The obtained solid electrolyte (2) sheet was a self-supporting sheet without chipping of the periphery or cracks occurring therein even if pinched with tweezers, and having a strength that enables easy handling or moving operation.

(Ionic Conductivity)
The ionic conductivity of the obtained solid electrolyte (2) sheet was measured. The result was $1 \times 10^{-2}$ mS/cm.

<Solid Electrolyte Sheet Laminate>
By superimposing the first self-supporting sheet and the second self-supporting sheet and pressing the same with a pressure of 3500 kg/cm², a solid electrolyte laminated sheet was obtained.

(Ionic Conductivity)
The ionic conductivity of the obtained solid electrolyte laminated sheet was measured. The result was $3 \times 10^{-3}$ mS/cm.

<Solid State Battery>
(Positive Electrode)
Li(NiCoMn)$O_2$ as a positive electrode active material, Thio-LISICON ($Li_{3.25}Ge_{0.25}P_{0.75}S_4$) as a solid electrolyte, acetylene black as a conduction aid, and SBR as a binder were weighed at a mass % ratio of 75:22:3:3. By putting these materials and an appropriate amount of butyl butyrate into a rotation/revolution mixer, stirring them at 2000 rpm for 3 minutes and then performing a defoaming process for 1 minute, a positive electrode coating liquid was prepared.

(Negative Electrode)
Graphite powder as a negative electrode active material, $Li_2S$—$P_2S_5$ (80:20 mol %) as a solid electrolyte, and SBR as a binder were weighed at a mass % ratio of 65:35:3. By putting these materials and an appropriate amount of butyl butyrate into a rotation/revolution mixer, stirring them at 2000 rpm for 3 minutes and then performing a defoaming process for 1 minute, a negative electrode coating liquid was prepared.

(Solid Electrolyte)
The solid electrolyte laminated sheet obtained above was used as a solid electrolyte.

(Fabrication of Solid State Battery)
By disposing the first self-supporting sheet of the solid electrolyte sheet to contact the negative electrode, disposing the second self-supporting sheet to contact the positive electrode and laminating them, a solid state battery was fabricated.

<Measurement of Resistance Value>
Under an environment of 25° C., charging was performed to 4.2 V at a current density of 0.1 C, discharging was performed to 2.5 V at a current density of 0.1 C, and discharge capacity was measured. Then, a value at the time of measurement at an alternating current frequency of 1 kHz was taken as an impedance (resistance) value.

Examples 2 to 3 and Comparative Examples 1 to 4

Solid electrolyte sheets were obtained in the same manner as in Example 1 except that the solid electrolytes described in Table 1 were used, and solid state batteries were fabricated. The obtained solid electrolyte sheets and solid state batteries were evaluated in the same manner as in Example 1. The results are shown in Table 1.

TABLE 1

| | First Self-Supporting Sheet (Negative Electrode Side) | Second Self-Supporting Sheet (Positive Electrode Side) | Nonwoven Fabric | Discharge Capacity (mAh/g) | Resistance (Ω) |
|---|---|---|---|---|---|
| Example 1 | $Li_2S$—$P_2S_5$ (80:20 mol %) | Thio-LISICON ($Li_{3.25}Ge_{0.25}P_{0.75}S_4$) | PET | 145 | 21 |
| Example 2 | $Li_2S$—$P_2S_5$ (80:20 mol %) | Thio-LISICON ($Li_{3.25}Ge_{0.25}P_{0.75}S_4$) | PE | 141 | 28 |

TABLE 1-continued

| | First Self-Supporting Sheet (Negative Electrode Side) | Second Self-Supporting Sheet (Positive Electrode Side) | Nonwoven Fabric | Discharge Capacity (mAh/g) | Resistance (Ω) |
|---|---|---|---|---|---|
| Example 3 | Li$_2$S—P$_2$S$_5$ (80:20 mol %) | Thio-LISICON (Li$_{3.25}$Ge$_{0.25}$P$_{0.75}$S$_4$) | Glass fiber | 142 | 25 |
| Comparative Example 1 | Thio-LISICON (Li$_{3.25}$Ge$_{0.25}$P$_{0.75}$S$_4$) | Li$_2$S—P$_2$S$_5$ (80:20 mol %) | PET | 50 | 183 |
| Comparative Example 2 | Li$_2$S—P$_2$S$_5$ (80:20 mol %) | Li$_2$S—P$_2$S$_5$ (80:20 mol %) | PET | 140 | 62 |
| Comparative Example 3 | Li$_2$S—P$_2$S$_5$ (80:20 mol %) | Single layer without laminating | PET | 143 | 45 |
| Comparative Example 4 | Thio-LISICON (Li$_{3.25}$Ge$_{0.25}$P$_{0.75}$S$_4$) | Single layer without laminating | PET | 57 | 168 |

In Comparative Example 1, the sheets used in Example 1 were disposed in a reverse manner. That is, a sheet susceptible to oxidation was disposed in contact with the positive electrode layer, and a sheet susceptible to reduction was disposed in contact with the negative electrode layer. Reductive decomposition of Thio-LISICON (Li$_{3.25}$Ge$_{0.25}$P$_{0.75}$S$_4$) was intense, the discharge capacity reduced, and the resistance increased.

In Comparative Example 2, since two self-supporting sheets in which the same solid electrolyte was filled were superimposed, the resistance was higher than in Example 1.

In Comparative Examples 3 and 4, the self-supporting sheets were not laminated and tests were conducted on a single-layer sheet. Comparative Example 3 had smaller ionic conductivity than Example 1 and therefore had a larger resistance than Example 1. In Comparative Example 4, reductive decomposition of Thio-LISICON (Li$_{3.25}$Ge$_{0.25}$P$_{0.75}$S$_4$) was intense, the discharge capacity reduced, and the resistance increased.

The disclosure provides a solid electrolyte laminated sheet including a plurality of supports, wherein each of the supports is a self-supporting sheet in which a solid electrolyte is filled, and the self-supporting sheets constitute a laminate, wherein one outermost layer is a self-supporting sheet in which a solid electrolyte resistant to oxidation is filled, and the other outermost layer is a self-supporting sheet in which a solid electrolyte resistant to reduction is filled.

The supports may be a nonwoven fabric.

The supports may be a heat-resistant fiber.

The supports may include at least one selected from the group consisting of an aramid fiber, an Al$_2$O$_3$ fiber and a glass fiber.

The supports may have a porosity of 60% to 95% and may have a thickness of 5 μm to 30 μm.

The solid electrolyte may contain a lithium element.

The solid electrolyte may contain at least either phosphorus or sulfur.

Another embodiment of the disclosure provides a solid state battery including a positive electrode layer containing a positive electrode active material, a negative electrode layer containing a negative electrode active material, and a solid electrolyte layer located between the positive electrode layer and the negative electrode layer, wherein the solid electrolyte layer includes the above solid electrolyte laminated sheet.

The solid electrolyte laminated sheet of the disclosure have both oxidation resistance and reduction resistance properties. Accordingly, according to the solid electrolyte laminated sheet of the disclosure, a solid state battery having high output characteristics can be realized.

Further, if the solid electrolyte laminated sheet of the disclosure is formed of supports composed of a heat-resistant fiber, in a manufacturing process or the like of the solid state battery, a short circuit can be suppressed even if pressing is performed at a high temperature exceeding, for example, 200° C. In addition, the solid electrolyte can be sintered by high-temperature pressing, and as a result, interfacial resistance can be reduced and the battery's output can be further improved.

What is claimed is:

1. A solid state battery, comprising:
a positive electrode layer containing a positive electrode active material;
a negative electrode layer containing a negative electrode active material; and
a solid electrolyte layer located between the positive electrode layer and the negative electrode layer, wherein the solid electrolyte layer comprises a solid electrolyte laminated sheet, and the solid electrolyte laminated sheet comprises:
a plurality of supports,
wherein the supports are a plurality of self-supporting sheets, and each of the self-supporting sheets is filled with a solid electrolyte,
the supports have a porosity of 86% or more and 95% or less,
the supports comprise at least one selected from the group consisting of an aramid fiber, an Al$_2$O$_3$ and a glass fiber, and
the self-supporting sheets constitute a laminate, wherein
one outermost layer is a self-supporting sheet in which a solid electrolyte resistant to oxidation is filled and in which is in contact with the positive electrode layer, and
the other outermost layer is a self-supporting sheet in which a solid electrolyte resistant to reduction is filled and in which is in contact with the negative electrode layer.

2. The solid electrolyte laminated sheet according to claim 1, wherein
the supports have a thickness of 5 μm to 30 μm.

3. The solid electrolyte laminated sheet according to claim 1, wherein the solid electrolyte contains a lithium element.

4. The solid electrolyte laminated sheet according to claim 2, wherein the solid electrolyte contains a lithium element.

5. The solid electrolyte laminated sheet according to claim 1, wherein the solid electrolyte contains at least either phosphorus or sulfur.

6. The solid electrolyte laminated sheet according to claim 2, wherein the solid electrolyte contains at least either phosphorus or sulfur.

7. The solid electrolyte laminated sheet according to claim 4, wherein the solid electrolyte contains at least either phosphorus or sulfur.

\* \* \* \* \*